2 Sheets, Sheet 2.
I. S. Arnold,
Hay Press.
Nº 28,952.   Patented July 3, 1860.
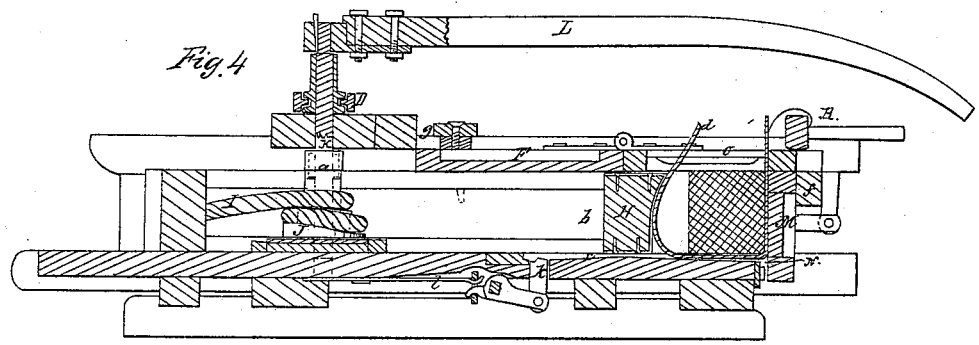
Fig. 4
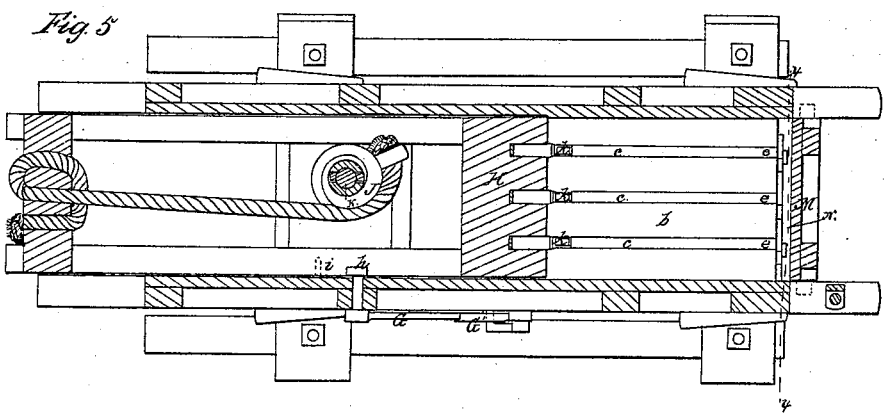
Fig. 5
Fig. 9
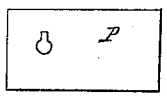
Fig. 6
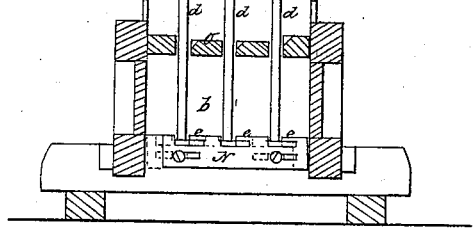
Fig. 7
Fig. 8
Witnesses;
James N. Callan
William O. Maguire
Inventor;
Ithiel S. Arnold.
by atty A. Gregory

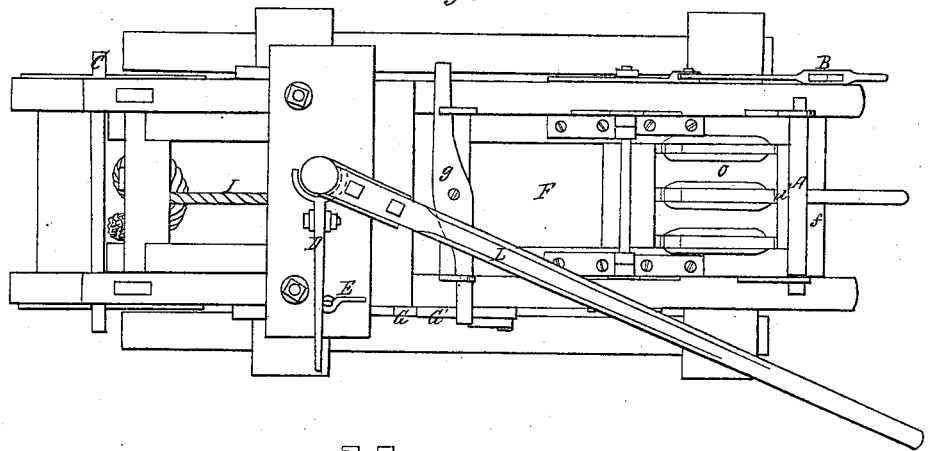
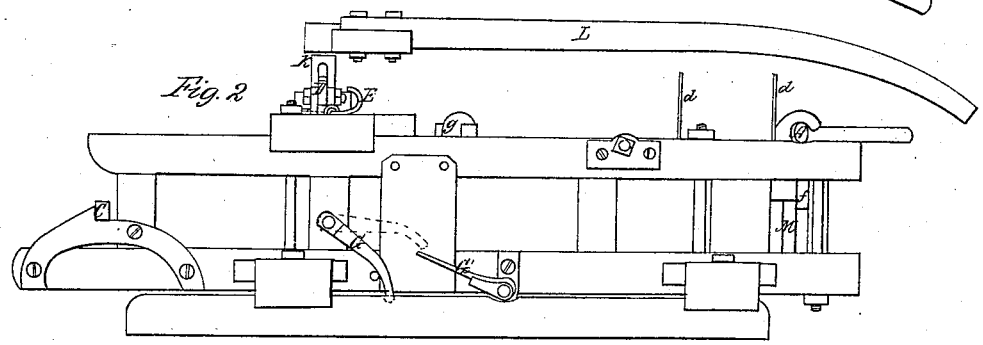
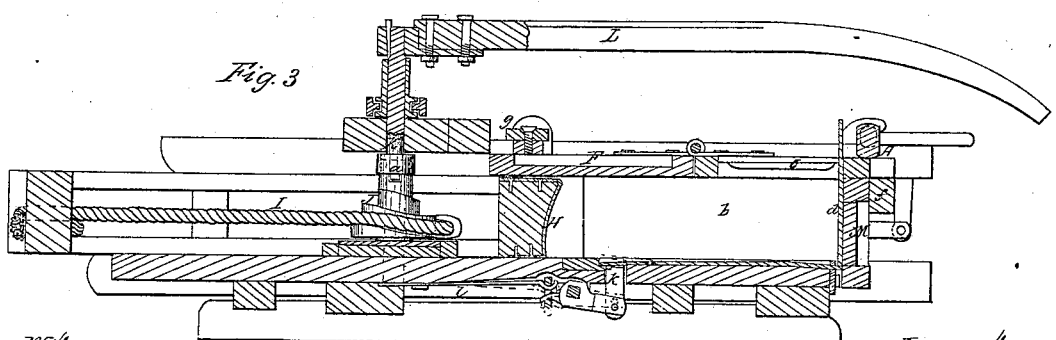

UNITED STATES PATENT OFFICE.

ITHIEL S. ARNOLD, OF SOUTH MILAN, INDIANA.

IMPROVEMENT IN HAY-PRESSES.

Specification forming part of Letters Patent No. 28,952, dated July 3, 1860.

*To all whom it may concern:*

Be it known that I, ITHIEL S. ARNOLD, of South Milan, in the county of Ripley and State of Indiana, have invented certain new and useful Improvements in Hay-Presses, of which the following, taken in connection with the accompanying drawings, which form part of this specification, is such a full and clear description as that others skilled in constructing and working hay-presses generally will be enabled to make and use this my improvement.

In the accompanying drawings, Figure 1 represents a plan view of a hay-press constructed according to this my invention; Fig. 2, a side view of the same; Figs. 3 and 4, vertical longitudinal sections with the working parts in different positions; Fig. 5, a horizontal section; Fig. 6, a transverse vertical section, mainly as indicated by the line $x\ x$ in Fig. 5; and Figs. 7, 8, and 9, diagrams or views of certain parts or details detached.

The frame of the press may be constructed in any suitable manner, and its dimensions varied according to circumstances; but in this description of my invention, and to economize space without prejudicially affecting the power and general convenience of the press, and to render it capable of pressing bales of good marketable weight, I shall name the following sizes as suitable under a system of refilling which may be adapted during the compression of a bale, as hereinafter more fully described. The whole length of the press may be seventeen feet; the length to be filled with hay, seven feet; breadth of latter, three and five-sixths feet, and depth two feet. Under the system of refilling which I prefer to adopt, this internal length of seven feet is made equivalent to one of twelve feet, so far as length of hay-space to make a bale is concerned, inasmuch as the seven feet length of chamber is first filled with hay and the follower made to compress the hay into two out of the seven feet, and then the follower run back, and the remaining five feet again filled with hay, which by the second forward action of the follower is pressed up against the two feet of previously-pressed hay, and the whole hard-pressed into two feet of the length of the pressing-chamber, that, being two feet deep, makes the "square" of the bale two feet. The follower H is operated by a rope or chain, I, attached at its one end to the follower in the rear of its frame, and wound round and attached at its other end to a conical or spiral grooved pulley, J, which may be two feet diameter where the rope is fastened, and its smallest diameter six inches. This conical pulley is hung independent of its vertical driving-shaft K, with which it is geared at pleasure by a clutch, $a$, and said shaft turned to draw the follower forward by a sweep, L, of, say, fifteen feet, to which a horse or other animal may be hitched. Said follower is made to travel on suitable and smooth "ways," to give it an easy, straight, and steady run, and so that it may be readily run back. It may, if desired, rest on and travel over or be provided with anti-friction rollers.

To commence a bale first remove the bar C, which acts as a stop in the rear of and to the follower; then bear down on a lever, D, which raises the driving-shaft with its clutch-formation $a$, and disconnects the conical pulley J from gear with the vertical driving-shaft K, and throw over said lever a hook, E. The follower H may then be run fully back. After this, throw down or open the end door, M, of the pressing-chamber $b$, and introduce along grooves $c$ in the bottom of said chamber the bale-hooping strips or hoop-irons $d$, and move crosswise a notched slide, N, so as to bring its overhanging lips $e$ over the strips, when the end door, M, should be raised, which will bend up the one end of the strips to form the hoops. The end door, M, may then be secured by throwing over its back a hinged bar, $f$, that is locked by a hinged pin and slotted lever, B. This being done, the press is ready for filling, which may be effected first by introducing the hay through the top of the pressing-chamber near the end door, which top part is covered, when closed, by a slatted door, O, that receives through the slots in it the projecting ends of the hoops. Said slatted door is now shut down or closed and made fast by a cam-lever or locking-bar, A. The pressing-chamber is next packed with hay in the rear by opening another door, F, which, afterward being closed, is secured by a locking-bar, $g$. Now unhitch the hook E from the clutch-lever D and start the sweep L, and the latter, with its shaft, will fall or be put in gear with the conical pulley J and continue to move round the sweep till the hay in the pressing-chamber is compressed into the size of a bale. Next pull down the clutch-lever D and secure it by the hook E, run the follower back, and, opening the hindermost door, F, refill with hay and close and secure said door. Then lift a lever, G, above an adjoining lever, G', whereby the first lever G is made to turn an arm, h, that, when the clutch is again made to engage the conical pulley with the driving-shaft and its sweep and the follower is again worked forward, is caught and acted upon by a projection, i, on the follower-frame and the first-named lever, G, made at the proper time and for a suitable interval to depress the second lever, G', and in so doing causes to throw up a series of elevating-plungers, k, connected with the shaft of the second lever, G', and that lifting the back ends of the hoops or hoop-strips, as shown by red lines in Fig. 3, make the follower in its advance bring the hoops along with it, bending their back or inner ends up and shooting the same through the slots in the slatted door, o, as shown in Fig. 4. A spring, l, serves to return and keep the elevating-plungers down after they have performed their duty of raising the ends of the strips for the follower to commence its action upon the same, whereby said plungers do not interfere with the passage of the follower over them. The elevating-plungers have their upward action limited and timed by the one lever G, disengaging itself at the proper time from or passing the adjoining and plunger-operating lever G', and till the two levers G G' are again put in gear the hooping contrivances remain inoperative or passive, and the press may be worked without action on or interference by the hoops, as required in the first run of the follower under the system of refilling I have here described. In the second run of the follower, after the hoops have been taken up and acted upon by it, the clutch-lever D may be pulled down and locked to permit of the follower being run back a little for the purpose of introducing a board, P, Fig. 9, which may be hung on a pin projecting from the front of the follower, for the purpose of straining the hoops tight against the bale. Such, however, may be dispensed with and the hoops strained up in the usual way. Now put in its place the stop-bar C, so as to lock the follower from running or springing back, and the nailing of the hoops may then be proceeded with. This may be done by first laying in the slots of the slatted door O small strips of timber, and then bending the ends of the hoops, which project through the slots in the door over and down upon and nailing them to said strips, as shown in Figs. 7 and 8. After the nailing of the hoops is completed, the slatted door O is opened and thrown back and the end door, M, relieved from its locking contrivances, when the pressure of the bale will throw said latter door down. The slide N is then moved to permit of the passage of the hoops through its notches and the hooped bale removed by, say, turning the sweep to make the follower force the bale out. By this my invention the bale may be hooped while under pressure and without opening any portion of the press for the purpose; also, the hoops, if desired, may be raised by machinery actuated by the follower in the manner described or in any other suitable way, to make the follower catch the hoops and turn them up over or against the bale and through the slatted door, or the hoop-running mechanism may be operated independently of the follower, or the follower be run back and the ends of the hoops be raised by hand for the follower to catch them. All requisite power and speed, and gradually increasing force as the resistance in pressing up the bale becomes greater, is obtained; and the follower may be run back without carrying along with it its driving mechanism or the sweep, and if the horse operating the sweep happens to stop in an inconvenient place for the "hands" in attendance on the press he may be moved round out of the way without winding or unwinding on the rope that draws the follower.

What is here claimed as new and useful is—

1. The combination, with the grooved pressing-chamber and follower, of the slatted top or side door, O, end door, M, and notched slide N, substantially as specified, or the equivalents of these devices, whereby the bale may be hooped while in the press without opening the press for the purpose.

2. Combining with the follower mechanism for raising the ends of the hoops in the press without opening the latter, to secure the action of the follower upon the hoops, substantially as specified.

3. The arrangement of the doors F, O, and M, essentially as shown and described.

4. The combination, with the follower, of the clutch a, conical pulley J, rope or chain I, and sweep L, substantially as specified, and for the purposes herein set forth.

In testimony whereof I have hereunto subscribed my name.

ITHIEL S. ARNOLD.

Witnesses:
WILLIAM R. TRUITT,
THOMAS CARR.